(12) United States Patent
Abujbara

(10) Patent No.: US 6,898,645 B2
(45) Date of Patent: May 24, 2005

(54) DYNAMIC GENERATION OF A USER INTERFACE BASED ON AUTOMATIC DEVICE DETECTION

(75) Inventor: Nabil M. Abujbara, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 392 days.

(21) Appl. No.: 10/123,191

(22) Filed: Apr. 17, 2002

(65) Prior Publication Data

US 2003/0200371 A1 Oct. 23, 2003

(51) Int. Cl.⁷ .................................................. G06F 3/00
(52) U.S. Cl. ........................... 710/17; 710/19; 345/825
(58) Field of Search ........................ 710/305, 15–19, 710/120; 345/825, 835, 839–840, 779, 810, 902, 965; 358/401, 402

(56) References Cited

U.S. PATENT DOCUMENTS

| | | | |
|---|---|---|---|
| 5,161,102 A | 11/1992 | Griffin et al. | |
| 5,568,536 A | 10/1996 | Tiller et al. | |
| 5,572,683 A | 11/1996 | Epolite et al. | |
| 5,604,860 A * | 2/1997 | McLaughlin et al. | 345/866 |
| 5,634,075 A | 5/1997 | Smith et al. | |
| 5,659,801 A | 8/1997 | Kopsaftis | |
| 5,673,385 A | 9/1997 | Mack et al. | |
| 5,717,439 A * | 2/1998 | Levine et al. | 345/835 |
| 5,717,839 A | 2/1998 | Ichikawa | |
| 5,732,283 A | 3/1998 | Rose et al. | |
| 5,790,119 A * | 8/1998 | Sklut et al. | 345/839 |
| 5,826,075 A | 10/1998 | Bealkowski et al. | |
| 5,852,743 A | 12/1998 | Yeh | |
| 5,878,256 A | 3/1999 | Bealkowski | |
| 5,898,823 A | 4/1999 | Sorkin et al. | |
| 5,987,535 A | 11/1999 | Knodt et al. | |
| 6,021,276 A | 2/2000 | Demke et al. | |
| 6,094,548 A | 7/2000 | Gunning et al. | |
| 6,167,464 A | 12/2000 | Kretschmann | |
| 6,195,171 B1 | 2/2001 | Ochiai | |
| 6,272,561 B1 | 8/2001 | Chang et al. | |
| 6,285,890 B1 | 9/2001 | Panian | |
| 6,373,507 B1 * | 4/2002 | Camara et al. | 345/825 |
| 6,553,431 B1 | 4/2003 | Yamamoto et al. | |

FOREIGN PATENT DOCUMENTS

EP 0 975 145 1/2000

OTHER PUBLICATIONS

"ScanGear Toolbox 3.0 User's Guide, for Windows/Macintosh", pp. 1–51, (© 2001, Canon, Inc.).
"Automatic Configuration of a Personal Computer System", *IBM Technical Disclosure Bulletin*, Sep. 1989, pp. 112–115.

* cited by examiner

*Primary Examiner*—Khanh Dang
(74) *Attorney, Agent, or Firm*—Fitzpatrick, Cella, Harper & Scinto

(57) ABSTRACT

The present invention concerns the dynamic generation of a user interface (UI) based on detected devices and on capabilities of the detected devices. The UI including one or more selection options corresponding to detected devices and at least one selection option that is selectable to cause at least two of the detected devices to function so as to provide an identified collective capability that combines the capabilities of two or more of the detected devices, wherein the collective capability is available in the UI when the two or more detected devices are present, and unavailable when one or more of the device is absent.

18 Claims, 6 Drawing Sheets

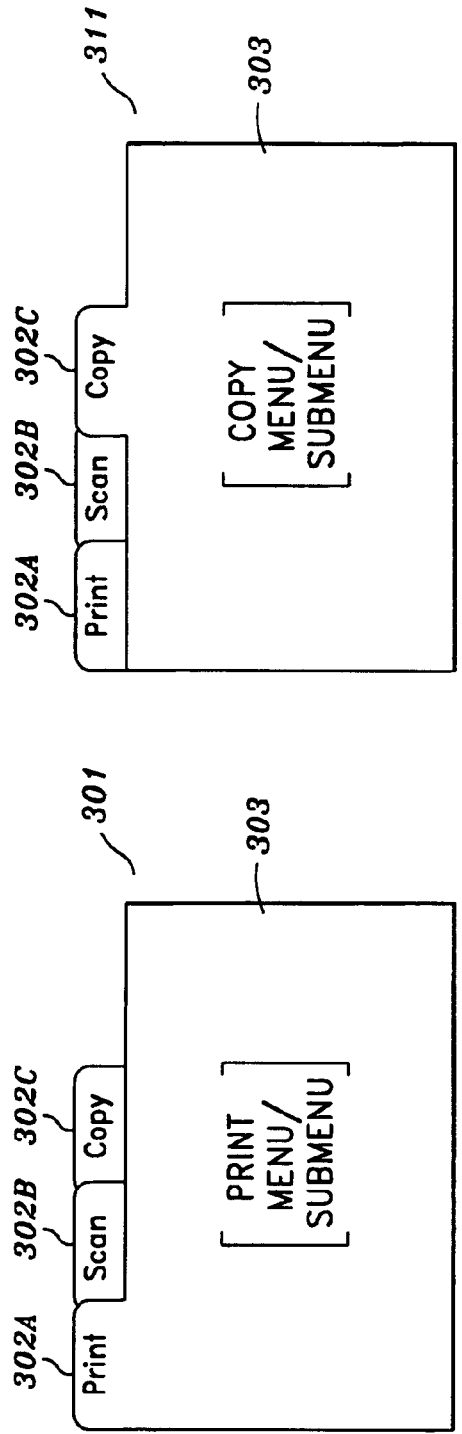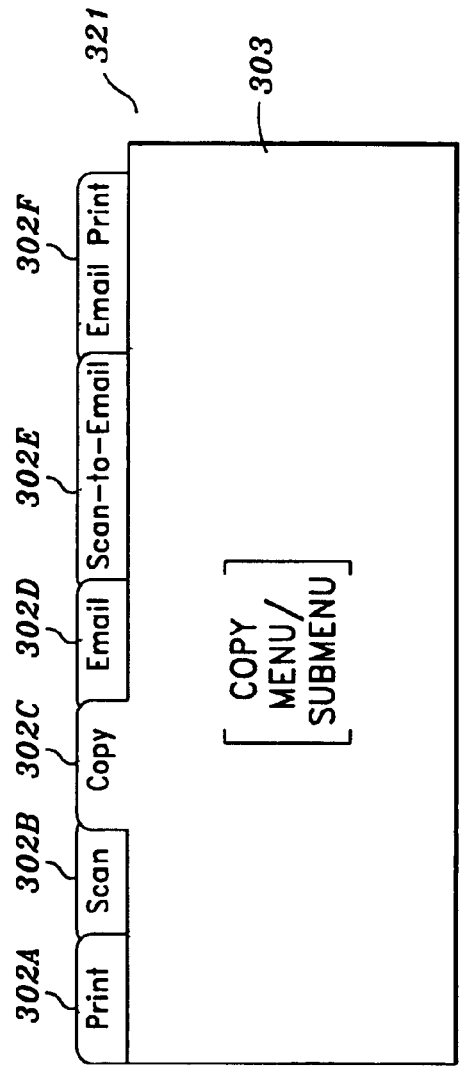

|                | COPY | EMAIL-TO-PRINT | SCAN-TO-EMAIL | WEB SCAN |
|----------------|------|----------------|---------------|----------|
| PRINTER        | X    | X              |               | X        |
| SCANNER        | X    |                |               |          |
| EMAIL          |      | X              | X             | X        |
| UPLOAD         |      | X              | X             |          |
| NETWORK ACCESS |      |                | X             | X        |

FIG. 6

DYNAMIC GENERATION OF A USER INTERFACE BASED ON AUTOMATIC DEVICE DETECTION

BACKGROUND OF THE INVENTION

1. Field of the Invention

The present invention relates to the dynamic generation of a user interface that reflects the devices detected, and more particularly, to a user interface that includes an option selectable to cause two or more detected devices to perform collective capabilities, each of which combines the capabilities of the two or more detected devices, the user interface further includes selection options for separately using the capabilities of the detected devices.

2. Description of the Related Art

Consumers/users have come to rely more on electronic devices such as personal computers, printers, scanners, digital cameras and the like. In addition, an increased emphasis has been placed on internetworking of these devices. As users become more reliant on these devices, the need for "convenience of use" of these devices becomes more and more critical. Difficulties that are encountered when installing and setting up of a device and/or when using the device can result in a level of frustration and ultimately in a lack of use. Thus, there is a need to facilitate the setup and use of a device. There is also a need to be able to optimize the capabilities of each of the devices.

One conventional approach that has been adopted for setting up resources like modems or network cards and peripherals of a computer system is known as plug-n-play (PnP). Its successor is known as universal PnP, or uPnP, which is a peer-to-peer architecture for configuring a new device when it is added to a network. PnP and uPnP, which are referred to collectively herein as PnP, are standards for automatically detecting and facilitating the installation of the appropriate drivers necessary for operating the detected devices. As a result, when a device (e.g., a printer, scanner, camera, network adapter, etc.) is initially connected to a system or network, it is detected and the user is prompted by the system control software to select the appropriate software (e.g., device driver) and default system settings (e.g., interrupts and direct memory access channels) necessary to use the newly-connected device.

PnP has facilitated the initial installation and setup of a device. Still PnP does not address the ease of use of a device after it has been installed. For example, it remains an onus on the user to make sure that the device is available for use, and to determine those capabilities provided by an available device. In addition, PnP does not aid a user in determining what, if any, capabilities can be performed by using a combination of devices.

For example, a user may desire to copy a paper document. If the user's computing system has an installed scanner and printer, the user can first scan the document using the scanner, save the scanner output to a file in the computers file system and then send the document to the printer from within an application that can read, and possibly convert, the scanner output file designated that is by the user.

In the above scenario, the user must be aware of the capabilities of the multiple devices (i.e., the scanner, the printer, the computer software, etc.), and must oversee the process. It would be beneficial for a user interface to present a copy functionality to the user without the need for any intervention by the user.

Conventional user interfaces, such as those available from Hewlett Packard and Canon as well as other manufacturers, include a copy button for use with a scanner device. However, the user must intervene at least to specify which printer is to be used as well as to specify the default settings needed to use that printer with the copy button. However, there is no automatic detection of a printer for use with the copy function. Thus, the user must first indicate the printer that is to be used to output the scanned-in document.

Further, in the conventional user interface the copy button is available regardless of whether a printer is available to print output from the scanner, i.e., regardless of whether a copy operation can actually be carried out. In other words, in a conventional scanner user interface, the copy function is available to be selected without regard to whether the devices that are needed to perform the copy operation are available.

Since the scanner's user interface is preset, or predetermined, there is no ability to automatically update the user interface to reflect the devices that are actually connected, or to identify device combinations based on detected devices that can provide added functionality.

In addition to preset UIs, a multifunction peripheral (MFP), which is also referred to as an "All-in-One" product and which physically consists of multiple devices in a single housing, is pre-configured by the device manufacturer to include a preset combination of devices (e.g., a scanner, printer, etc.). An MFP user is limited to the preset configuration and the capabilities of the MFP's devices. For example, to perform a copy operation using an MFP, the user uses the pre-set scanning and printing capabilities of the MFP.

A user may use another device in combination with an MFP. However, manual intervention of some sort is needed by the user to coordinate use of the MFP with the other device. Take, for example, a case where a user wishes to perform a copy operation using a printer other than the one provided by the MFP. In order to use the other printer identified by the user, the user must perform a multi-step process to first scan a document using the scanning function of the MFP, save/retrieve the scanned output, and submit a print job (e.g., from within a software program) to generate print data for printing by the other printer identified by the user.

Thus, it would be beneficial to be able to dynamically generate a user interface that reflects the devices that have been detected, and that reflects device combinations that are dynamically and automatically determined and that can provide added functionality without the need for a user to intervene in some manner.

SUMMARY OF THE INVENTION

The present invention comprises a method of dynamically generating a user interface (UI) based on detected devices and on capabilities of the detected devices. The capabilities of detected devices are identified, and at least one collective capability is identified, which combines the capabilities of more than one of the detected devices.

Based on the devices detected and the identified collective capability (or capabilities), a UI is generated that includes selection options, one of which corresponds to each of the collective capabilities. Each collective capability is available in the UI when detected devices that can provide such collective capability are present, and unavailable when any one or more of the devices is absent.

An advantage of the foregoing features is that it facilitates the use of devices, and in particular to the use of a combination of devices. A UI that is dynamically generated reflects the devices that have been detected and at least one device combination that is automatically determined based on the detected devices. Such a combination is made available to the user, and is carried out, without the user's intervention, via a centralized control function that automatically creates the new collective capability by utilizing the capabilities of a combination of detected devices that have been identified as being able to provide the collective capability.

Advantageously, the present invention provides additional value to the user by automatically creating functionality using detected devices thereby avoiding increased costs associated with adding new devices.

In addition, the present invention provides an alternative to an MFP, which is pre-configured by the device manufacturer, and which limits a user to the configuration and device capabilities dictated by the manufacturer. As an alternative to an MFP device, the present invention advantageously allows the user to use a favorite printer and/or a favorite scanner instead of using a manufacturer's predetermined device configuration.

In one aspect of the invention, a method is provided of dynamically generating a user interface (UI) based on detected devices and on capabilities of the detected devices, the method comprising detecting plural devices, identifying individual capabilities of the detected devices, automatically identifying at least one collective capability that combines capabilities of at least two of the detected devices, and generating a UI including one or more selection options corresponding to the plural devices and at least one selection option that is selectable to cause the at least two devices to function so as to provide the identified collective capability, wherein the collective capability is available in the UI when the at least two detected devices are present, and unavailable when any one or more thereof is absent.

In another embodiment, an apparatus comprises a user interface means, program memory to store process steps to: (1) detect plural devices, (2) identify capabilities of the detected devices, (3) automatically identify at least one collective capability that combines capabilities of at least two of the detected devices, (4) generate a UI for the user interface means that includes one or more selection options corresponding to the plural devices and at least one selection option that is selectable to cause the at least two devices to function so as to provide the identified collective capability, wherein the collective capability is available in the UI when the at least two detected devices are present, and unavailable when any one or more thereof is absent, and a processor for executing the process steps stored in said program memory.

This brief summary has been provided so that the nature of the invention may be understood quickly. A more complete understanding of the invention can be obtained by reference to the following detailed description of the preferred embodiment(s) thereof in connection with the attached drawings.

BRIEF DESCRIPTION OF THE DRAWINGS

FIGS. 3A to 3C illustrate examples of UIs generated according to the present invention.

FIG. 6 provides examples of collective capabilities and the connected devices that may be used to provide the collective capabilities according to the present invention.

DETAILED DESCRIPTION OF THE PREFERRED EMBODIMENTS

Figure 1:
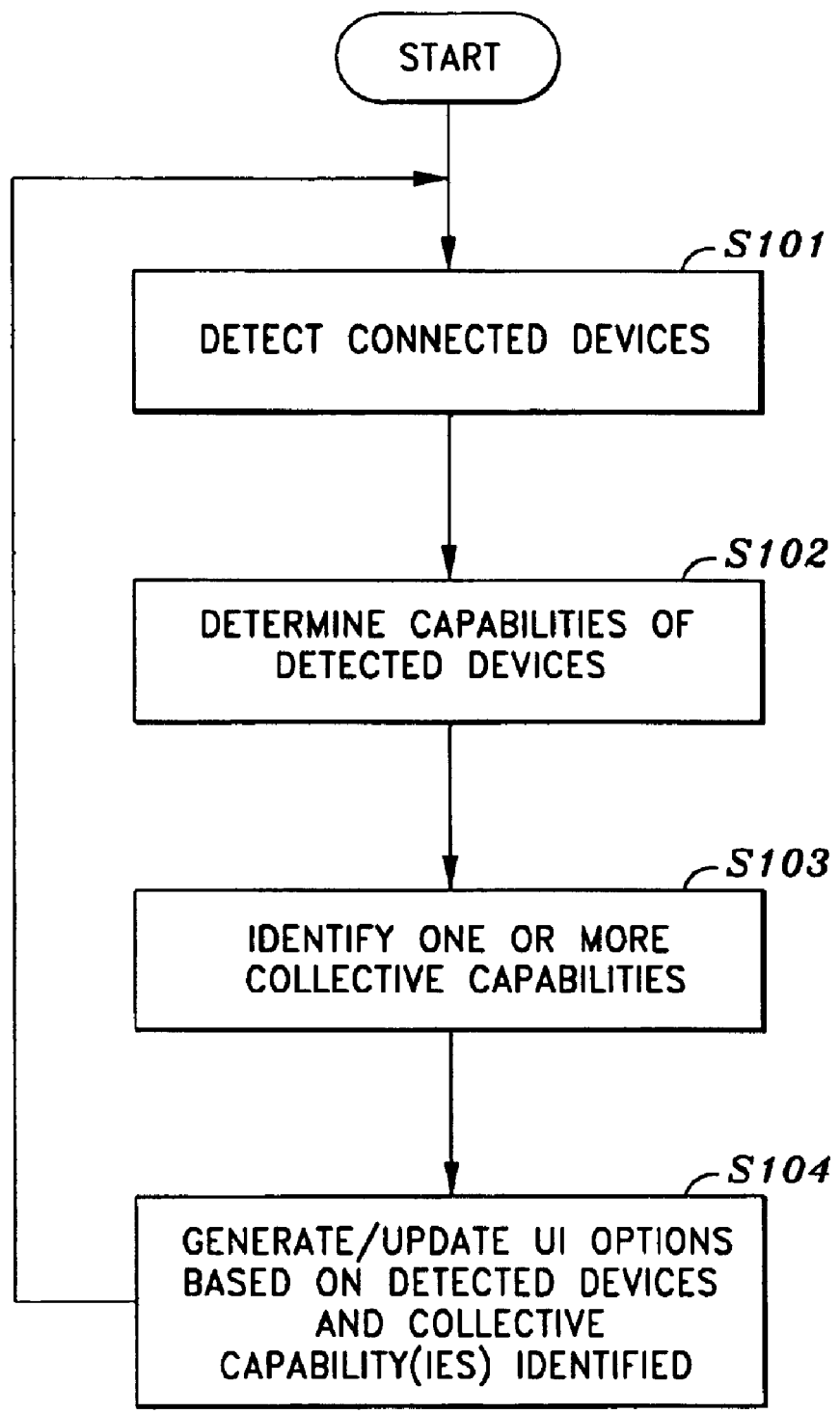
FIG. 1 illustrates a flow diagram of process steps to dynamically generate a user interface (UI) based on the detected devices and on capabilities of the detected devices according to the present invention.

FIG. 1 illustrates a flow diagram of process steps to dynamically generate a user interface (UI) based on the detected devices and on capabilities of the detected devices according to the present invention.

In a most preferred embodiment of the invention, the process steps of FIG. 1 are performed by a stand-alone controller to which the detected devices are connected. The controller is discussed in more detail below and with reference to FIG. 2.

Referring to FIG. 1, the connected devices are detected at step S101. Examples of devices that may be detected include a printer, scanner, network connection which uses a dial-up or high speed modem and a network interface, digital camera, personal computer, data storage device, multifunction device (MFP), email software client, upload software client, keyboard, mouse, remote control, display etc.

At step S102, the capabilities of the detected devices are identified. For example, if a printer is detected, a printing capability is identified. Similarly, if a scanner is detected, a scanning capability is identified.

At step S103, one or more collective capabilities are automatically identified based on the capabilities of the detected devices. Each collective capability uses some or all of the capabilities of two or more detected devices. One example of a collective capability is a copy capability which is performed using a printer and a scanner detected in step S101.

At step S104, a UI is generated that includes selection options that correspond to the devices detected in step S101, each selection option provides access to the capabilities of a detected device (i.e., the capabilities identified in step S102 separate from a collective capability associated with the detected device). The UI further includes at least one selection option that is selectable to cause at least two devices to function so as to provide a collective capability identified in step S103.

According to the present invention, a collective capability that is selectable via the UI generated in step S104 is available when the at least two detected devices are present and unavailable when any one or more of the detected devices identified to provide the collective capability is absent. As is discussed in more detail below, the UI is updated to add/remove a collective capability based on those devices that are detected in step S101.

Figure 2:
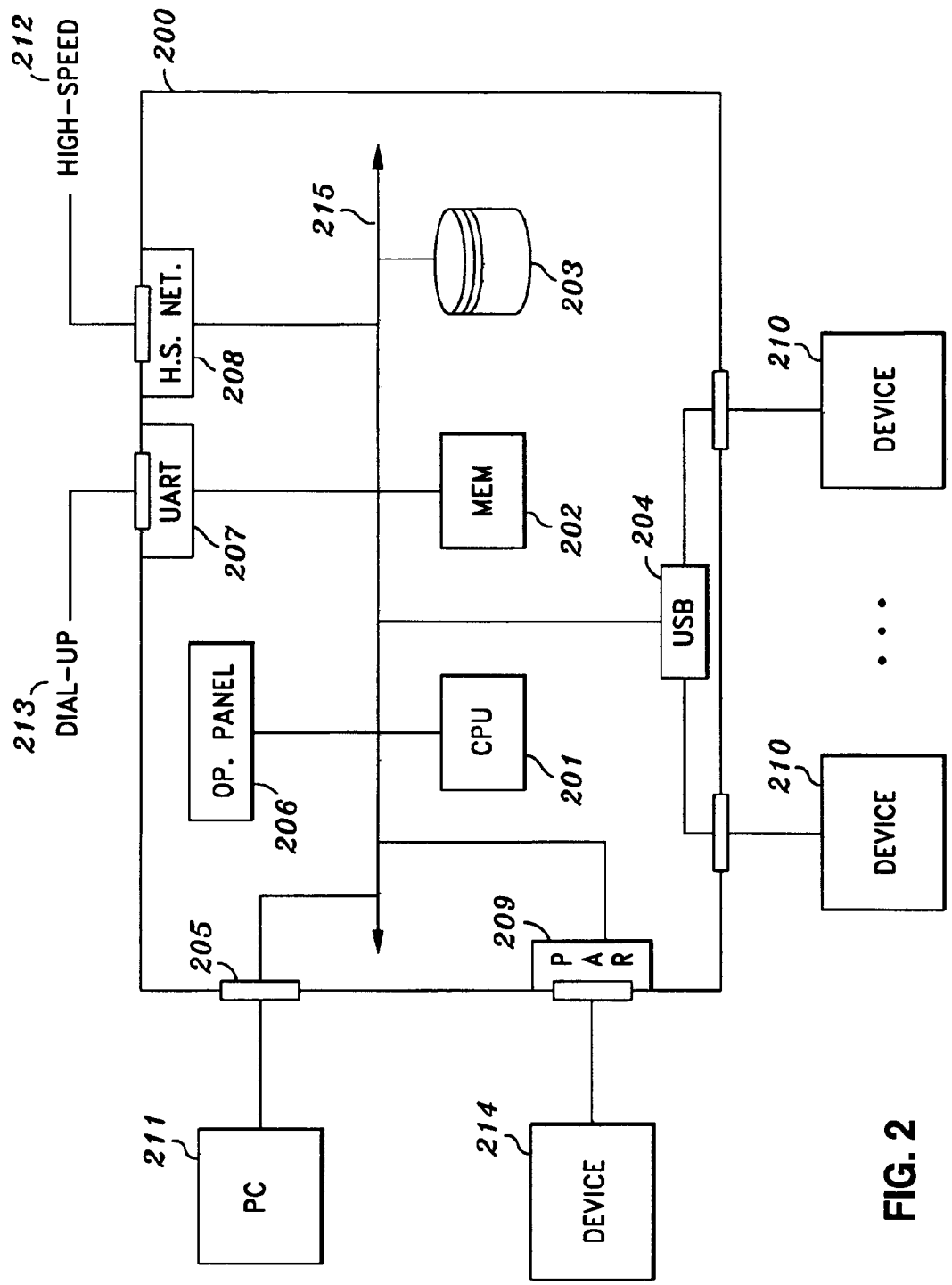
FIG. 2 provides an architectural overview of a controller for use with the present invention.

FIG. 2 provides an architectural overview of a controller for use with the present invention. In a most preferred embodiment, controller 201 depicted in FIG. 2 implements the steps of FIG. 1 to generate a UI based on the devices that are connected to it, and the capabilities of the connected devices. Controller 201 supports connections to a plurality of devices via different types of interfaces. Examples of devices that are capable of being connected to controller 201 include universal serial bus (USB) devices 210 interfaced via USB host interface 204, personal computer 210 connected via USB client interface 205, high-speed network connection 212 which uses network interface 208 (e.g., wired or wireless) and a high-speed modem such as a digital subscriber line (DSL) modem (not shown), a dial-up network connection 213 using dial-up interface 207 (e.g., a universal asynchronous receiver transmitter (UART) interface) and a dial-up modem (not shown), and/or device 214 connected via parallel interface 209.

Other device connections to controller 200 as well as other types of devices other than those depicted in FIG. 2 may also be used with the present invention. For example, a device (e.g., media reader, digital camera, printer, scanner, etc.) may be connected to controller 200 via a network connection (e.g., network connection 212).

Also shown in FIG. 2 is CPU 201 which interfaces with memory 202 (e.g., random access, read-only memory, etc.), storage 203, operator panel 213, USB host interface 204, USB client interface 205, network interfaces 208 and 213 and parallel interface 209 via computer bus 215.

Storage 203 is a form of persistent storage that stores data and program files, the program files including executable program code, such as that needed to implement the steps S101 to S104 of FIG. 1 as well as other process steps of the present invention. In such a case, the program code is retrievable from storage 202 into memory 202 for execution by CPU 201.

Storage 203 further includes information used to identify the capabilities of each detected device and the collective capabilities that are available using the detected devices, and may also include application software (e.g., graphics, image processing, word processing, etc.), data files, and program code (e.g., device and/or interface drivers).

Operator panel 206 provides an input and/or output interface. For example, panel 206 may be used to display the UI generated by the present invention. Panel 206 may further include a keypad or other input device for entry of user selections.

FIGS. 3A to 3C illustrate examples of UIs generated according to the present invention. In each of the examples, the UI comprises tabs that correspond to either a detected device's menu hierarchy (i.e., menu and any submenus) or a collective capability's menu hierarchy. To move to a given menu hierarchy, a user selects the tab that corresponds to the hierarchy. A menu hierarchy comprises an initial menu and none or more submenus. While a tabbed approach is used in FIGS. 3A to 3C, other UI techniques may be used with the present invention. For example, it is possible to display a list of the menu hierarchies, each entry in the list being selectable to display the initial/root menu of a hierarchy.

It is possible in using the present invention to detect more than one of the same type of device. For example, two scanners may be detected by controller 200, and UI 301 may include a tab for each detected scanner. As is discussed in more detail below, one alternative may be selected to provide its capabilities for a collective capability. If the selected alternative becomes unavailable, another alternative may be used as a substitute, if it is still available.

Referring to FIG. 3A, UI 301 comprises tabs 302A to 302C and menu display area 303. Display area 303 includes options that are selectable to access the detected device or a collective capability that uses the capabilities of the detected devices. In the example of FIG. 3A, printer, scanner, and email client devices are detected in step S101 of FIG. 1.

Using a print menu hierarchy which is accessible via tab 302A, a user can set printer preferences and send a print job to the printer for printing. Print drivers and other software needed to control the print job and/or to generate the print data is preferably resident on controller 200 (e.g., stored in storage 203 and executed by CPU 201). However, it is possible that the necessary program code is resident on an external computing device (e.g., PC 211). To further illustrate, scan tab 302B may be selected to scan a document using a detected scanner.

Tab 302C represents a copy collective capability that combines the capabilities of the printer and scanner devices. Prior to depicting tab 302C in UIs 301 and 311, a copy collective capability is identified in step S102, which uses the scanning and printing capabilities of a printer and scanner detected in step S101.

When tab 302C is selected, UI 311 in FIG. 3B shows the copy menu hierarchy. A copy menu hierarchy is displayed in display area 303 of FIG. 3B, which provides selections to control copying options and to initiate a copy operation. Using default settings, user settings or both, controller 200 controls a copy operation so that a document is automatically scanned by a detected scanner and print data is generated from the scanned output is printed by a detected printer using the copy settings.

Upon connection of one or more other devices, the UI (e.g., UI 301 or 311) is automatically updated to include the newly-detected devices. FIG. 3C depicts UI 321 which is generated upon detection of an email device (e.g., an email client and a network access connection).

UI 321 includes new tabs 302D and 302E. Tab 302D represents an email menu hierarchy corresponding to the newly-detected email device, tab 302E represents an scan-to-email collective capability to scan a document and send the scanner output to a recipient via email, and tab 302F represents an email-to-print capability of automatically printing email using the detected email device and the printer. The email, scan-to-email and email-to-print menu hierarchies include selections to control email, scan-to-email and email-to-print options and operations, respectively.

In addition to adding options upon connection of a device, the present invention also removes options when a device is determined to no longer be connected, or otherwise is unavailable. For example, upon a determination that the email device is no longer connected, UI 321 is updated to remove tabs 302D to 302F and their corresponding menu hierarchies, which results in either of UIs 301 or 311.

Figure 4:
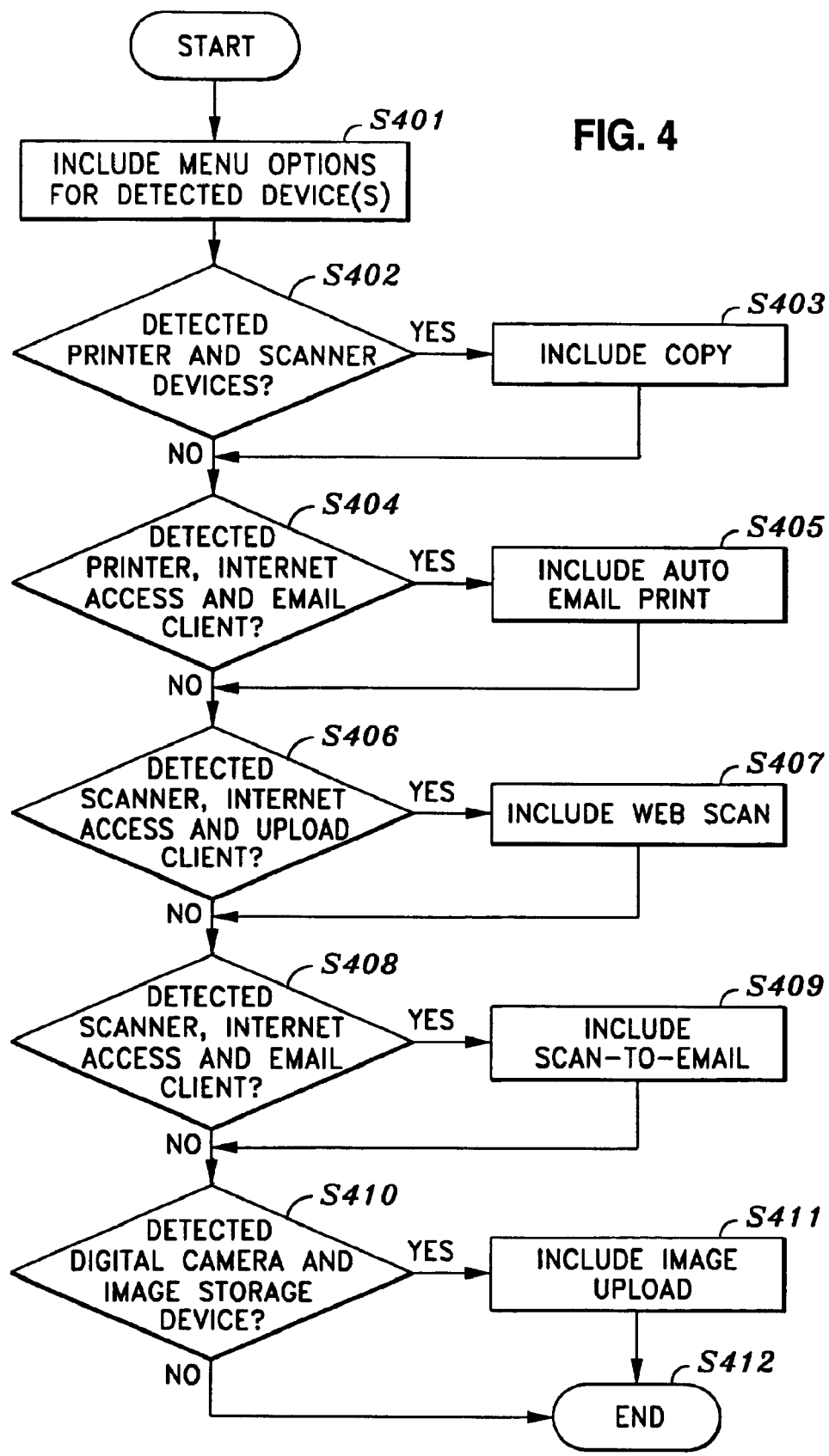
FIG. 4 illustrates a flow diagram of process steps to generate a based on detected devices and identified collective capabilities provided by the detected devices according to the present invention.
Figure 5:
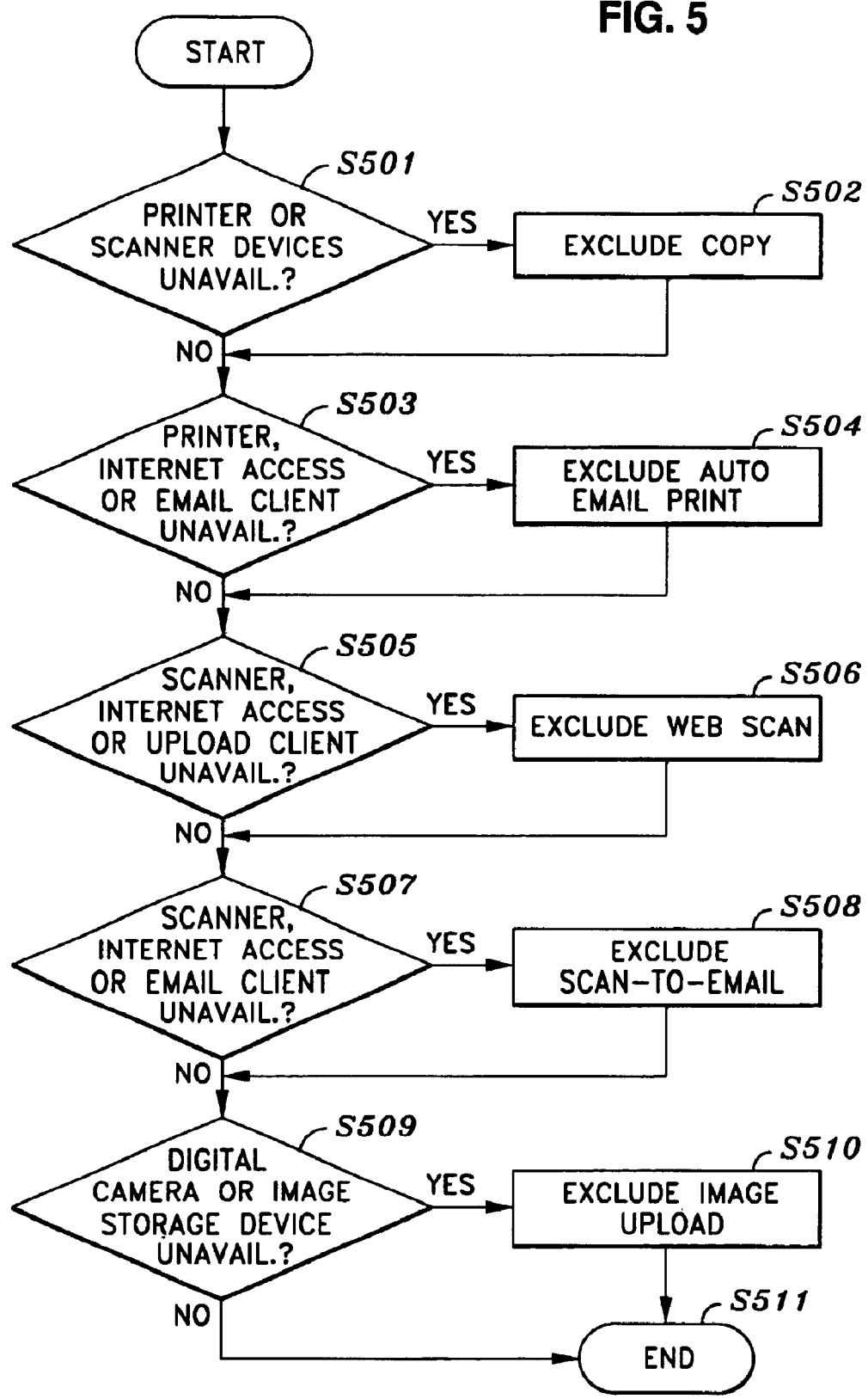
FIG. 5 illustrates a flow diagram of process steps to generate an updated UI based on detected devices and identified collective capabilities provided by the detected devices according to the present invention.

FIGS. 4 and 5 illustrate flow diagrams of process steps to generate a UI based on a detected device connection or disconnection, respectively, according to the present invention. FIG. 6 provides examples of collective capabilities and the connected devices that may be used to provide the collective capabilities. It should be apparent that the present invention is not limited to the devices and/or collective capabilities that are depicted in the process flows of FIGS. 4 and 5, or in the table of FIG. 6.

Referring first to FIG. 6, a copy capability is provided using the image capturing capabilities of a scanner and the print output capabilities of a printer. An email-to-print capability, which automatically prints email messages received over the Internet (or other network) to a printer, uses an email client, network access and a printer.

A scan-to-email collective capability, which automatically generates an email message including output from a scanner and sends the message via a network access connection to the Internet (or other network), uses an email client, network access and a scanner. Finally, a web scan capability uses a scanner, an upload client (e.g., a file transfer application) and Internet (or other network) access to automatically upload scanner output to a network site via the network access.

Turning to FIG. 4, a flow diagram of process steps to generate a UI based on detected devices and on identified collective capabilities provided by the detected devices is now provided.

Briefly, a UI is generated that includes an option selectable to cause two or more detected devices to perform a collective capability, which combines the capabilities of the two or more detected devices. The user interface further includes selection options for separately using the capabilities of the detected devices.

At step S401 of FIG. 4, the menu hierarchy corresponding to each detected device is included in the UI. Thereafter, steps are performed to identify those collective capabilities provided by combining the capabilities of two or more of the detected devices. At step S402, a determination is made whether printer and scanner devices are connected. If so, processing continues at step S403 to include a copy collective capability in the UI. Processing continues at step S404.

At step S404, a determination is made whether printer, Internet access and email client devices are available. If so, processing continues at step S405 to include an automatic email-to-print capability. Processing continues at step S406 to determine whether scanner, Internet access and upload client devices are present. If so, processing continues at step S407 to include a web scan collective capability in the UI.

Processing continues at step S408 to determine whether scanner, Internet access and email client devices are present. If so, processing continues at step S409 to include a scan-to-email collective capability. Processing continues at step S410 to determination whether a digital camera and image storage device are available. If so, processing continues at step S411 to include an image upload collective capability to the UI. Processing ends at step S412.

FIG. 5 illustrates a flow diagram of process steps to generate an updated UI based on detected devices and identified collective capabilities provided by the detected devices according to the present invention. Briefly, the process steps of FIG. 5 are performed to update a UI upon a determination or detection that one or more devices are no longer connected. When a device is determined to be unavailable, it may be necessary to remove a menu hierarchy of a collective capability if the collective capability uses the device. However, if another detected device can act as a substitute to provide the capability needed for the collective capability, the UI may be updated to reflect the use of the other device (e.g., update the UI to reflect any device-specific aspects of the collective capability menu hierarchy). In addition, the UI is updated to remove or exclude the disconnected device.

In the example of FIG. 5, it is assumed that another device cannot be used as a substitute for a disconnected device. However, it should be apparent to one skilled in the art that the steps of FIG. 5 may be altered to include the ability to determine whether a substitute device is available.

At step S501 of FIG. 5, a determination is made whether a printer and/or scanner device is no longer available. If so, processing continues at step S502 to exclude the copy collective capability from the UI. If a copy menu was included in the UT prior to the disconnection of the printer and/or scanner devices, the UI is updated to remove the copy menu or to otherwise make it unavailable/unselectable from the UI. Processing continues at step S503.

At step S503, a determination is made whether any or all of the printer, Internet access and email client devices have become unavailable. If so, processing continues at step S504 to exclude an automatic email-to-print capability from the UI. Processing continues at step S505 to determine whether any of the previously-detected scanner, Internet access and upload client devices have become unavailable. If so, processing continues at step S506 to exclude a web scan collective capability from the UI.

Processing continues at step S507 to determine whether any of the previously-detected scanner, Internet access and email client are no longer available. If so, processing continues at step S508 to exclude a scan-to-email collective capability. Processing continues at step S509 to determine whether detected digital camera and image storage devices are no longer available. If so, processing continues at step S510 to exclude an image upload collective capability from the UI. Processing ends at step S511.

Where more than one device alternative can be used to contribute its functionality to perform a collective capability, one device may be selected over another based on one or more optimization considerations.

For example, performance and/or quality considerations may be taken into account to select one device alternative over another. In this regard, quality and performance characteristics for each device and/or a each combination of devices are quantified and a unique index is assigned to each device/combination. The index is used to retrieve the corresponding characteristics, which are used to make a selection by comparing the retrieved optimization values for each selection and malting the desired selection based on the comparison. In so doing, an optimal device combination can be achieved to provide a collective capability.

In this regard, the invention has been described with respect to particular illustrative embodiments. However, it is to be understood that the invention is not limited to the above-described embodiments and that various changes and modifications may be made by those of ordinary skill in the art without departing from the spirit and the scope of the invention.

What is claimed is:

1. A method of dynamically generating a user interface (UI) based on detected devices and on capabilities of the detected devices, the method comprising:

detecting plural devices;

identifying capabilities of the detected devices;

automatically identifying at least one collective capability that combines capabilities of at least two of the detected devices; and generating a UI including one or more selection options corresponding to the plural devices and at least one selection option that is selectable to cause the at least two devices to function so as to provide the identified collective capability, wherein the collective capability is available in the UI when the at least two detected devices are present, and unavailable when any one of the devices is absent.

2. A method according to claim 1, wherein said UI is a displayed graphical UI (GUI).

3. A method according to claim 2, wherein the GUI comprises a hierarchy of menus.

4. A method according to claim 3, wherein a sub-menu from the root of the menu hierarchy is accessed via a tab that is displayed in the root menu.

5. A method according to claim 1, wherein the collective capability is a copy, an electronic mail print, a scanned-in image upload to web, a scanned-in image electronic mail send, or an image upload to storage collective capability.

6. A method according to claim 5, wherein the at least two devices identified for use with the image upload to storage collective capability comprise a media reader, removable media readable by the media reader, and persistent storage that is connected to the media reader.

7. A method according to claim 6, wherein the media reader is a digital camera.

8. A method according to claim 6, wherein the media reader is connected to the persistent storage via a detected network connection.

9. A method according to claim 5, wherein the at least two devices identified to provide the copy collective capability comprise a printer and a scanner.

10. A method according to claim 9, wherein the printer and scanner are interconnected via a detected network connection.

11. A method according to claim 5, wherein the at least two devices identified for use with the electronic mail print collective capability comprise an electronic mail device and a printer.

12. A method according to claim 11, wherein the electronic mail device is a computer executing an electronic mail application, and the electronic mail device and the printer are interconnected via a detected network connection.

13. A method according to claim 5, wherein the at least two devices identified for use with the scanned-in image upload to web collective capability comprise a scanner, an Internet connection, and a web site that is accessed via the Internet connection.

14. A method according to claim 5, wherein the at least two devices identified for use with the scanned-in image electronic mail send collective capability comprise a scanner and an electronic mail device.

15. A method according to claim 14, wherein the electronic mail device is a computer executing an electronic mail application.

16. A method according to claim 15, wherein the electronic mail device and the printer are interconnected via a detected network connection.

17. An apparatus comprising:

a user interface means;

program memory to store process steps to: (1) detect plural devices, (2) identify capabilities of the detected devices, (3) automatically identify a collective capability that combines capabilities of at least two of the detected devices, and (4) generate a UI for the user interface means that includes one or more selection options corresponding to the plural devices and at least one selection option that is selectable to cause the at least two devices to function so as to provide the identified collective capability, wherein the collective capability is available in the UI when the at least two detected devices are present, and unavailable when any one of the devices is absent;

a processor for executing the process steps stored in said program memory.

18. An apparatus according to claim 17, wherein the process steps further include a step to activate program code to perform the collective capability.

* * * * *

UNITED STATES PATENT AND TRADEMARK OFFICE
CERTIFICATE OF CORRECTION

PATENT NO. : 6,898,645 B2
DATED : May 24, 2005
INVENTOR(S) : Nabil M. Abujbara

It is certified that error appears in the above-identified patent and that said Letters Patent is hereby corrected as shown below:

Column 1,
Line 57, "computers" should read -- computer's --.

Column 3,
Line 67, "generate a" should read -- generate a UI --.

Column 4,
Line 26, "modern" should read -- modem --.

Column 7,
Line 62, "UT" should read -- UI --.

Column 8,
Line 29, "malting" should read -- making --.

Signed and Sealed this

Third Day of January, 2006

JON W. DUDAS
*Director of the United States Patent and Trademark Office*